(12) United States Patent
Goode (10) Patent No.: US 7,771,094 B2
(45) Date of Patent: Aug. 10, 2010

(54) MOUNTING BRACKET FOR ELECTRICAL JUNCTION BOX, LUMINAIRE OR THE LIKE

(76) Inventor: John A. Goode, 1372 Brush Hill Rd., #B208, Milton, MA (US) 02186

( * ) Notice: Subject to any disclaimer, the term of this patent is extended or adjusted under 35 U.S.C. 154(b) by 0 days.

(21) Appl. No.: 12/140,563

(22) Filed: Jun. 17, 2008

(65) Prior Publication Data

US 2009/0310371 A1 Dec. 17, 2009

(51) Int. Cl.
*F21V 15/00* (2006.01)
(52) U.S. Cl. .................. 362/365; 362/145; 362/147; 362/148; 362/150; 362/368; 362/370
(58) Field of Classification Search .............. 362/145, 362/147, 148, 150, 365, 370; 248/121, 126, 248/205.1, 309.1, 906; 174/50, 54, 58, 61, 174/135
See application file for complete search history.

(56) References Cited

U.S. PATENT DOCUMENTS

| | | | |
|---|---|---|---|
| 5,222,800 A * | 6/1993 | Chan et al. | 362/147 |
| 5,841,068 A * | 11/1998 | Umstead et al. | 174/58 |
| 2007/0007028 A1 | 1/2007 | Borbolla | 174/58 |

FOREIGN PATENT DOCUMENTS

DE 87 02 380 5/1987

OTHER PUBLICATIONS

Authorized Officer Lana Osafo-Gyimah, European Patent Office, PCT/US2009/047670, *International Search Report*, Oct. 19, 2009, 14 pages.

* cited by examiner

*Primary Examiner*—Sandra L O'Shea
*Assistant Examiner*—Meghan K Dunwiddie
(74) *Attorney, Agent, or Firm*—Sunstein Kann Murphy & Timbers LLP (57) ABSTRACT

Electrical fixtures, such as junction boxes or recessed luminaires, include mounting brackets that support the fixtures from structural members while fasteners, such as screws or nails, are driven through the mounting brackets, thereby facilitating mounting the fixtures. Each of the mounting brackets has a general U-shape that includes at least three generally planar sides. The top side is generally perpendicular to the other two sides, and the top side connects the other two sides and together. The three sides define (in cross-section) a structural member receiver opening. An inside dimension of the structural member receiver opening is such that bracket fits snugly around at least a portion of a commonly sized wood or metal structural member, such as a furring strip or joist, used in ceiling construction. In one embodiment, two of the sides of the structural member receiver opening define an acute dihedral angle to hood around the edge of a metal furring strip.

12 Claims, 10 Drawing Sheets

MOUNTING BRACKET FOR ELECTRICAL JUNCTION BOX, LUMINAIRE OR THE LIKE

TECHNICAL FIELD

The present invention relates to mounting brackets for electrical junction boxes, luminaires, etc. and, more particularly, to mounting brackets that support these types of fixtures, such as while fasteners are inserted to secure the brackets to structural members.

BACKGROUND ART

Installations of electrical junction boxes, recessed lighting fixtures, other types of luminaires or other types of electrical fixtures are commonly classified as "new work" or "old work" depending on how the fixtures are mounted. "Old work" refers to the use of existing plaster board or other surface material to support the fixtures. "New work" refers to the use of structural members, such as wood or metal joists or furring strips, to support the fixtures.

Installing a typical new work fixture in a ceiling is often awkward and sometimes hazardous, because the operation requires an installer to hold the fixture up against a structural member, typically over head, while the installer drives one or more fasteners, such as screws or nails, through a portion of the fixture, such as a bracket, into the structural member. Some prior-art fixtures include brackets having pointed prongs to facilitate installation. The prongs of such a fixture may be driven into lumber with a hammer to temporarily mount the bracket while the installer secures the bracket to the lumber with one or more fasteners. However, such temporary attachments are not reliable, particularly when used overhead.

SUMMARY OF THE INVENTION

An embodiment of the present invention provides an electrical fixture for mounting to a structural member. The electrical fixture includes a bracket and a housing attached to the bracket. The bracket includes at least three substantially planar sides. The first and third sides are parallel and spaced apart from each other. The second side is perpendicular to, and connects, the first and third sides. The first, second and third sides define, in cross-section, a structural member receiver opening. The housing has a primary access opening facing the same direction as the structural member receiver opening.

The third side of the bracket may define at least one hole. The second side of the bracket may define at least one hole. The second side of the bracket may define at least nine holes arranged in a regular two-dimensional pattern. Adjacent holes may be spaced apart a distance no greater than a diameter of one of the holes. The housing and one of the sides of the bracket may define coaxial holes.

The bracket may also include a lip extending from an end of the third side, parallel to the second side and toward the first side. Optionally or alternatively, the bracket may include a lip extending from an end of the first side, parallel to the second side and toward the third side.

The housing may be an electrical junction box or a recessed luminaire, or the housing may include an electrical junction box or a recessed luminaire.

The first side of the bracket may be at least three times as long as the second side, and the first side may define a plurality of holes.

Another embodiment of the present invention provides an electrical fixture for mounting to a structural member. The electrical fixture includes a bracket and a housing attached to the bracket. The bracket includes at least three substantially planar sides. The first and third sides of the bracket are spaced apart from each other. The second side connects the first and third sides. The second and third sides form an acute dihedral angle. The first, second and third sides define, in cross-section, a structural member receiver opening. The housing includes a primary access opening facing the same direction as the structural member receiver opening.

The housing may be an electrical junction box or a recessed luminaire, or the housing may include an electrical junction box or a recessed luminaire.

Yet another embodiment of the present invention provides a recessed luminaire for mounting to a structural member. The luminaire includes a bracket, a housing and a lamp receptacle disposed within the housing. The bracket includes at least three substantially planar sides. The first and third sides of the bracket are parallel and spaced apart from each other. The second side is perpendicular to, and connects, the first and third sides. The first, second and third sides define, in cross-section, a structural member receiver opening. The housing defines a primary access opening facing a direction opposite to the direction faced by the structural member receiver opening.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, electrical fixtures are disclosed that support themselves while fasteners are driven to secure the fixtures to structural members. As used herein, the term "fixture" includes electrical junction boxes, luminaires (such as recessed "light cans"), ceiling-mounted electric radiant infrared heaters, fans and the like.

Figure 1:
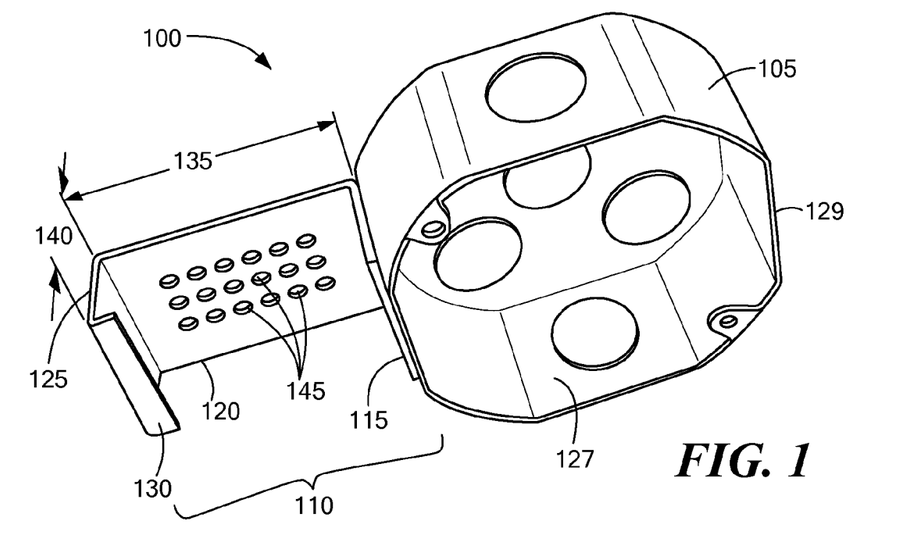
FIG. 1 is a perspective view (from below and to one side) of an electrical fixture that includes a junction box with an integral or attached mounting bracket, according to one embodiment of the present invention.
Figure 2:
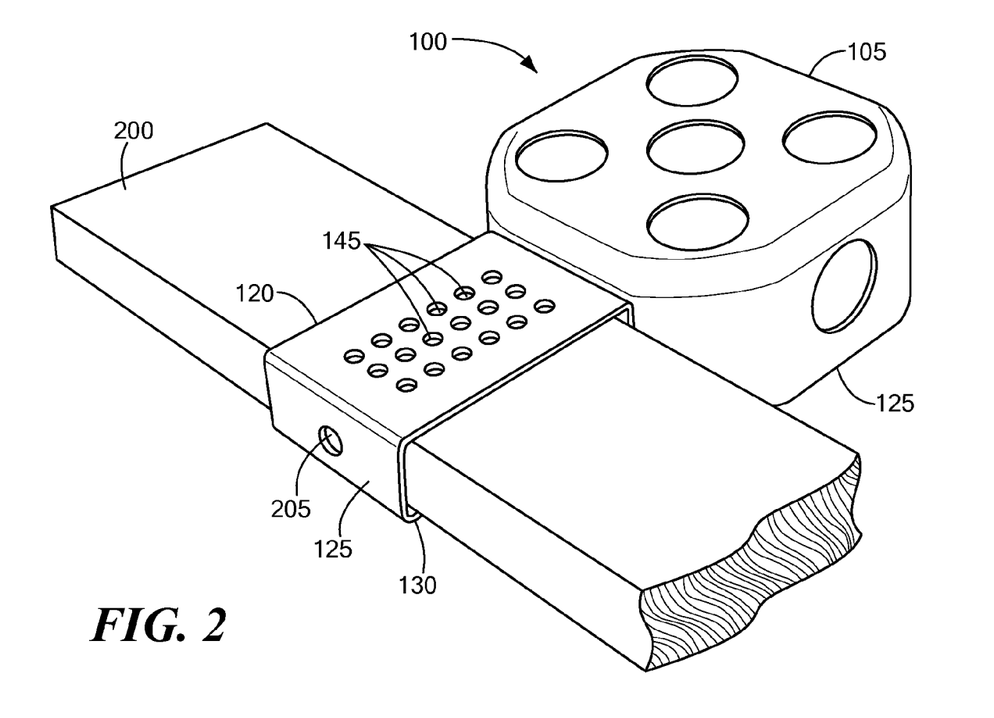
FIG. 2 is a perspective view (from above and to one side) of the fixture of FIG. 1 attached to a wood furring strip.
Figure 3:
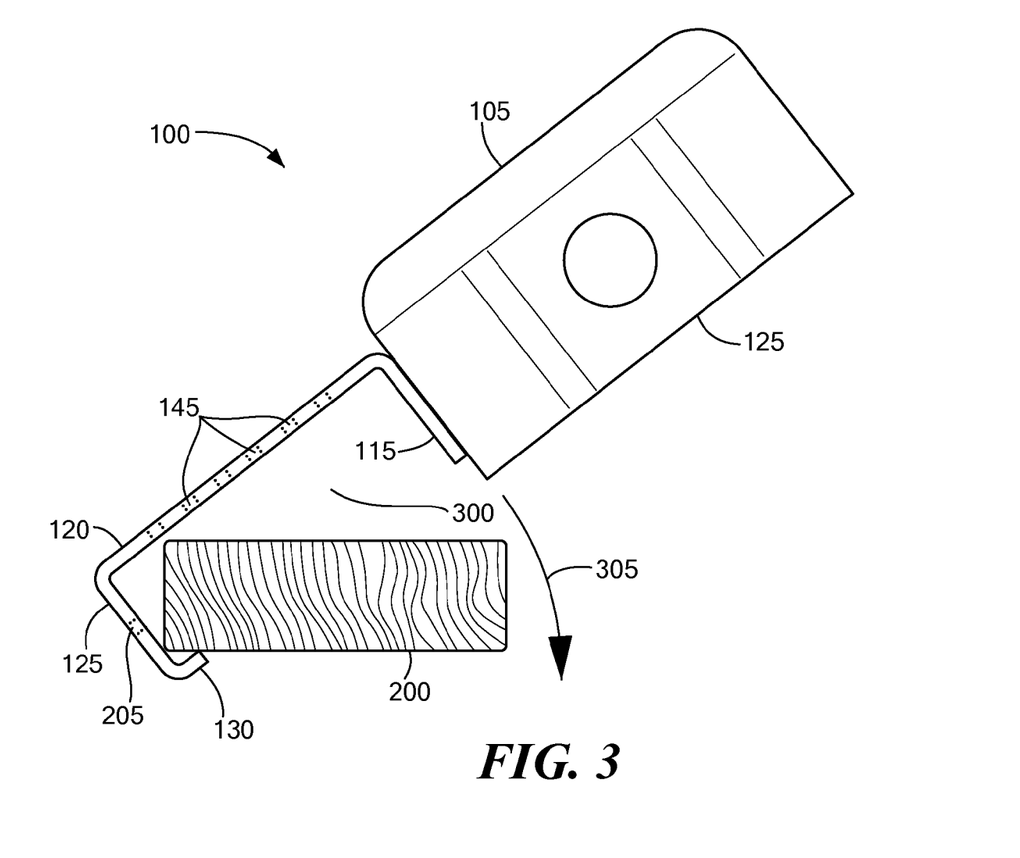
FIG. 3 is a side (and partially cross-sectional) view of the fixture of FIGS. 1 and 2 being attached to the furring strip.
Figure 4:
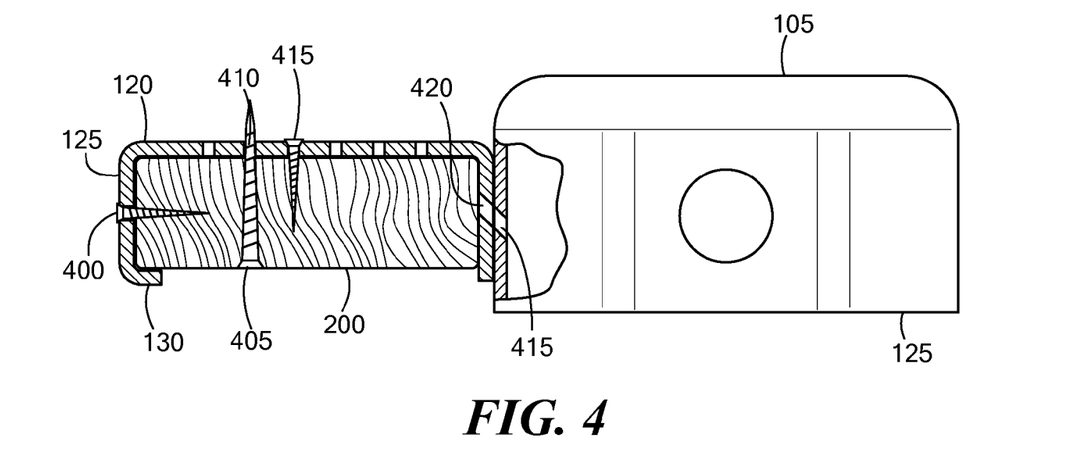
FIG. 4 is a side (and partially cross-sectional) view of the fixture of FIGS. 1-3 fully attached to the furring strip.

FIG. 1 is a perspective view (from below and to one side) of an electrical fixture 100 that includes a junction box 105 with an integral or attached mounting bracket 110, according to one embodiment of the present invention. FIG. 2 is a perspective view (from above and to one side) of the fixture 100 attached to a wood furring strip 200, although with modifications to the mounting bracket 110, the fixture 100 may be mounted to other types or sizes of structural members, such as metal furring strips or wood or metal joists, as described below. FIG. 3 is a side view of the fixture 100 being attached to the furring strip 200, and FIG. 4 is a side view of the fixture 100 fully attached to the furring strip 200, showing optional or alternative fastener arrangements, in this case using screws. In FIG. 4, the mounting bracket 110, the furring strip and a portion of a wall of the junction box 105 are shown in cross section. FIG. 4 also provides a cut-away view of a portion of the interior of the junction box 105.

As best seen in FIG. 3, the mounting bracket 110 has a general U-shape that includes at least three generally planar sides 115, 120 and 125. The top side 120 is generally perpendicular to the other two sides 115 and 125, and the top side 120 connects the other two sides 115 and 125 together. As shown in FIGS. 3 and 4, the three sides 115-125 define (in cross-section) an opening 300 in which the furring strip may be received. The junction box 105 forms a housing for electrical wires and/or wiring devices, such as receptacles. The junction box 105 has a primary access opening 125, through which the wires may be accessed or the wiring devices may be installed. It should be noted that the structural member receiver opening 300 faces in the same direction as the primary access opening 125. When used in a ceiling, both these openings 125 and 300 typically face generally downward.

In the embodiment shown in FIGS. 1-4, the bracket 110 includes a lip 130 extending from the left (as shown in FIGS. 1-5) side 125, generally parallel to the top side 120, toward the right side 115. However, in other embodiments, the lip 130 may be omitted as described below.

The sides 115 and 125 are parallel and spaced apart from each other. Two inside dimensions 135 and 140 of the bracket 110 are such that the bracket 110 fits snugly around at least a portion of commonly sized lumber, such as the furring strip 200, used in ceiling construction. In the embodiment shown in FIGS. 1-4, the junction box 105 is attached to the right side 115 of the bracket 110 by a weld, screws or any suitable mechanism. However, optionally or alternatively, the junction box 105 may be attached to one or more of the other sides 120 and/or 135 of the mounting bracket 110.

As shown in FIG. 3, when attaching the bracket 110 to the furring strip 200, the left side 125 of the bracket 110 is placed on one side of the furring strip 200, and the fixture 100 is pivoted, as indicated by arrow 305, until the top side 120 of the bracket 110 contacts the furring strip 200. Once the bracket 110 receives the furring strip 200, as shown in FIG. 4, one or more fasteners, such as screws or nails, may be driven through the bracket 110. As most clearly shown in FIG. 2, the left side 125 of the bracket 110 may define a hole 205, and, as shown in FIG. 4, a screw 400 may be driven through the hole 205 and into the furring strip 200 to secure the fixture 100 to the furring strip 200.

As shown in FIG. 4, optionally or alternatively, one or more fasteners, exemplified by a screw 405, may be driven up completely through the furring strip 200 and then through a respective hole 410 in the top side 120 of the bracket 110. A regular pattern of closely-spaced holes 145 facilitates driving such a fastener 405 from below, without requiring accurate measurements. The holes 145 may be spaced such that adjacent holes are spaced apart by a distance no greater than a diameter of one of the holes 145. Any number of holes 145 may be provided. In one embodiment, at least a 3×3 array of nine holes is provided, although the array need not be square. More or fewer holes may be used. As long as the fastener 405 is driven toward the general area of the holes 145, the fastener is likely to find one of the holes 145. If the fastener 405 is a screw, the screw should be sized slightly larger than any one of the holes 145, so threads of the screw bite into the circumference of the hole 145 that the screw finds.

Optionally or alternatively, one or more fasteners, exemplified by a screw 415, may be driven through respective holes 145 and then down into the furring strip 200. Optionally or alternatively, self-drilling and/or self-tapping screws may be used to eliminate the need for holes. Holes, or additional holes, may be drilled as needed using a portable drill or other tool, and then fasteners may be driven through the holes.

Optionally or alternatively, the junction box 105 and the mounting bracket 110 may define coaxial holes 415 and 420, respectively, to accommodate a fastener (not shown) driven through the holes 415-420, from inside the junction box 105, into the furring strip 200. The common axis of the holes 415-420 may be at an angle, relative to the top side 120 of the bracket.

Although FIGS. 1-4 illustrate use of screws to fasten the bracket 110 to the furring strip 200, other types of suitable fasteners may be used. If one or more nails are used as fasteners, the holes 145, 205 415 and/or 420 may be omitted. If a nail is driven up through the furring strip 200, the nail punches a hole through the top side 120 of the bracket 110 and creates a burr in the top side 120. The burr bites into the nail to hold the nail fast.

Once the furring strip 200 is received in the opening 300, the three sides 115-125, and optionally the lip 130, prevent the bracket 110, and therefore the junction box 105, from dislodging from the furring strip 200, before the bracket 110 is secured to the furring strip 200 with a fastener, as described above. An installer may, therefore, attach the fixture 100 to the furring strip 200, and the fixture 100 remains attached to the furring strip 200 until the fixture 100 is secured in place with the fastener. Consequently, the installer may use both hands to install the fastener to permanently secure the bracket 110 to the furring strip 200, or the installer may use one had to steady himself/herself during the operation. In other words, the installer need not hold the bracket 110 in place while installing the fastener.

Figure 5:
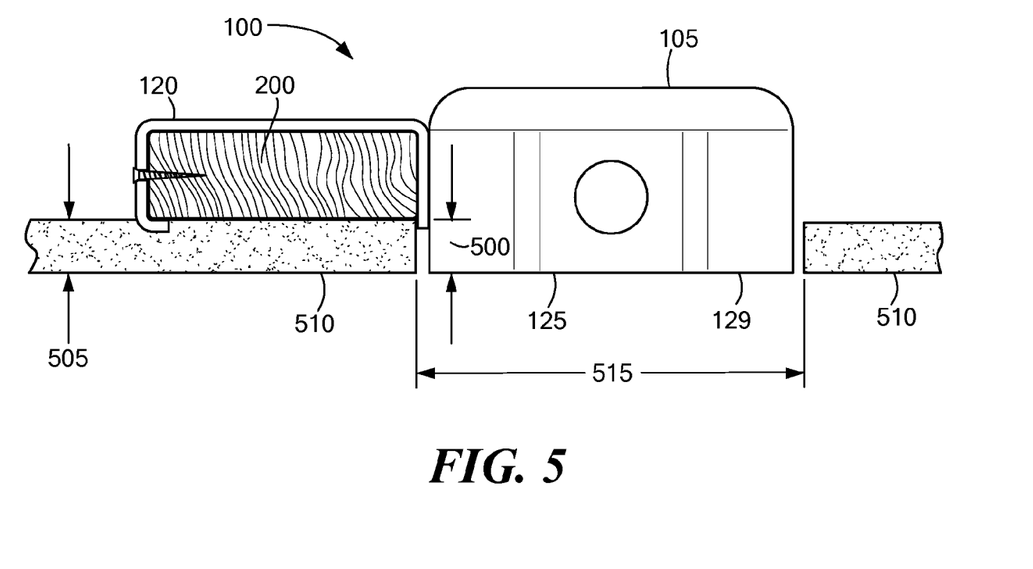
FIG. 5 is a side (and partially cross-sectional) view of the fixture of FIGS. 1-4 after plasterboard has been installed to the furring strip.

Optionally, as shown in FIG. 5, an edge 129 (see also FIG. 1) surrounding the primary access opening 125 of the junction box 105 is positioned, relative to the top side 120 of the mounting bracket 110, such that, when the junction box/mounting bracket combination 105/110 is fully installed on the furring strip 200, the edge 129 of the junction box 105 extends a predetermined distance 500, such as a distance approximately equal to a thickness 505 of gypsum plasterboard or other building material 510 that is to attached below the furring strip 200. In one embodiment, the distance 500 is ½-inch. In another embodiment, the distance is ⅝-inch. Typically, the plasterboard or other material 510 is installed after the junction box/bracket combination 105/110 is installed. Typically, an opening 515 is created in the plasterboard or other material 510 (either before or after installation) to provide access to the junction box 105.

Figure 6:
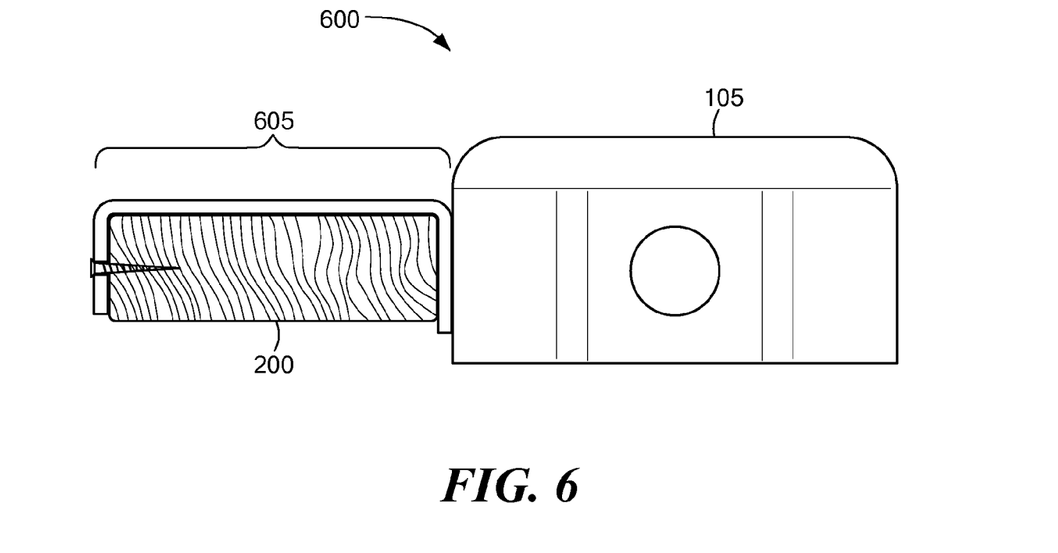
FIG. 6 is a side (and partially cross-sectional) view of an electrical fixture that includes a junction box with an integral or attached mounting bracket, according to another embodiment of the present invention.

As noted, the lip 130 (FIG. 1) is optional. FIG. 6 is a side view of a junction box 105 and mounting bracket 605, according to another embodiment of the present invention. In this embodiment, the lip 130 is omitted. In other respects, the junction box 105 and mounting bracket 605 combination is similar to the junction box/bracket combination 105/110 described above.

In any embodiment, the mounting bracket 110, 605 may be made of metal, plastic or any other suitable material or combination of materials, and the junction box 105 may be made of the same or a different material. The bracket 110, 605 may be attached to the junction box 105 by welding, riveting or by any other suitable attachment mechanism. Alternatively, the bracket 110, 605 and all or part of the junction box 105 may be unitized or they may be made of a common piece of material.

Figure 7:
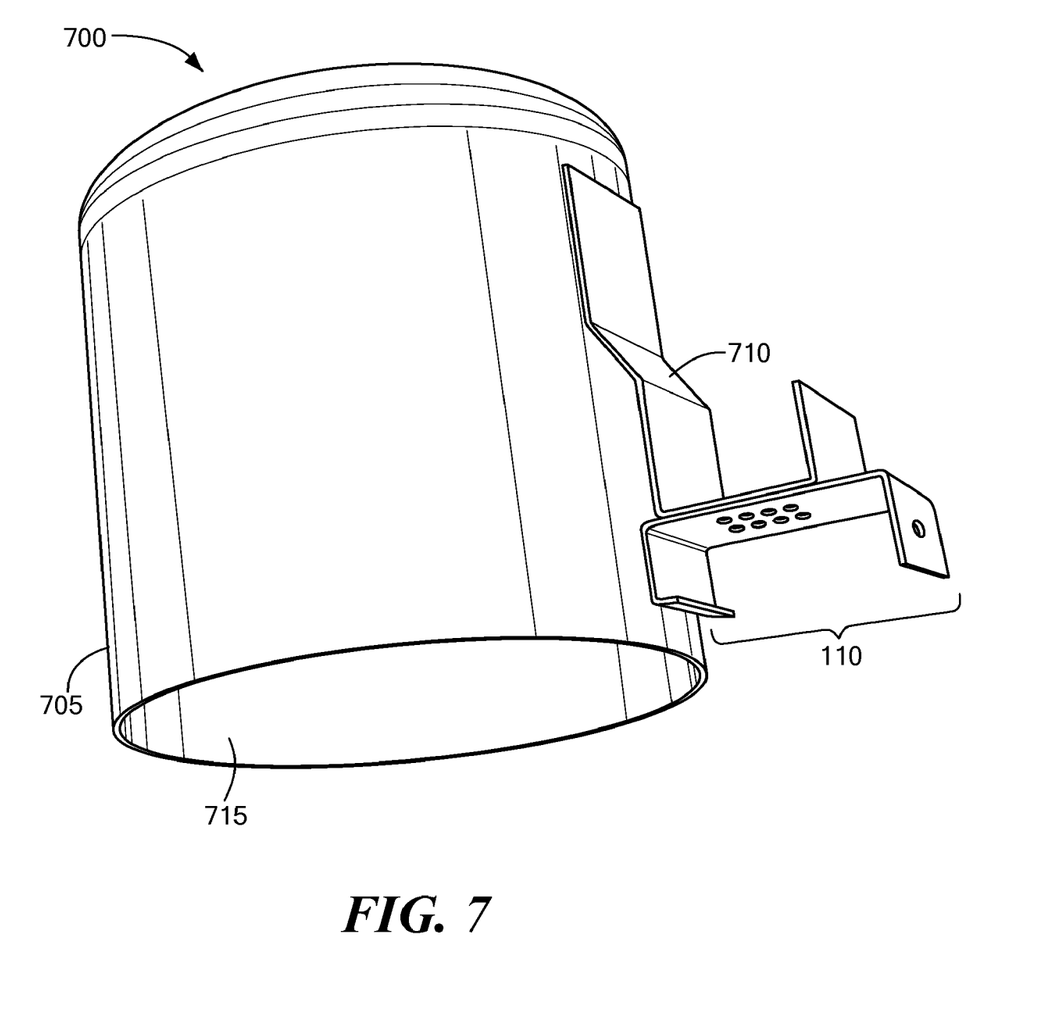
FIG. 7 is a perspective view of a recessed luminaire (commonly referred to as a "light can") with an integral or attached mounting bracket, according to one embodiment of the present invention.
Figure 8:
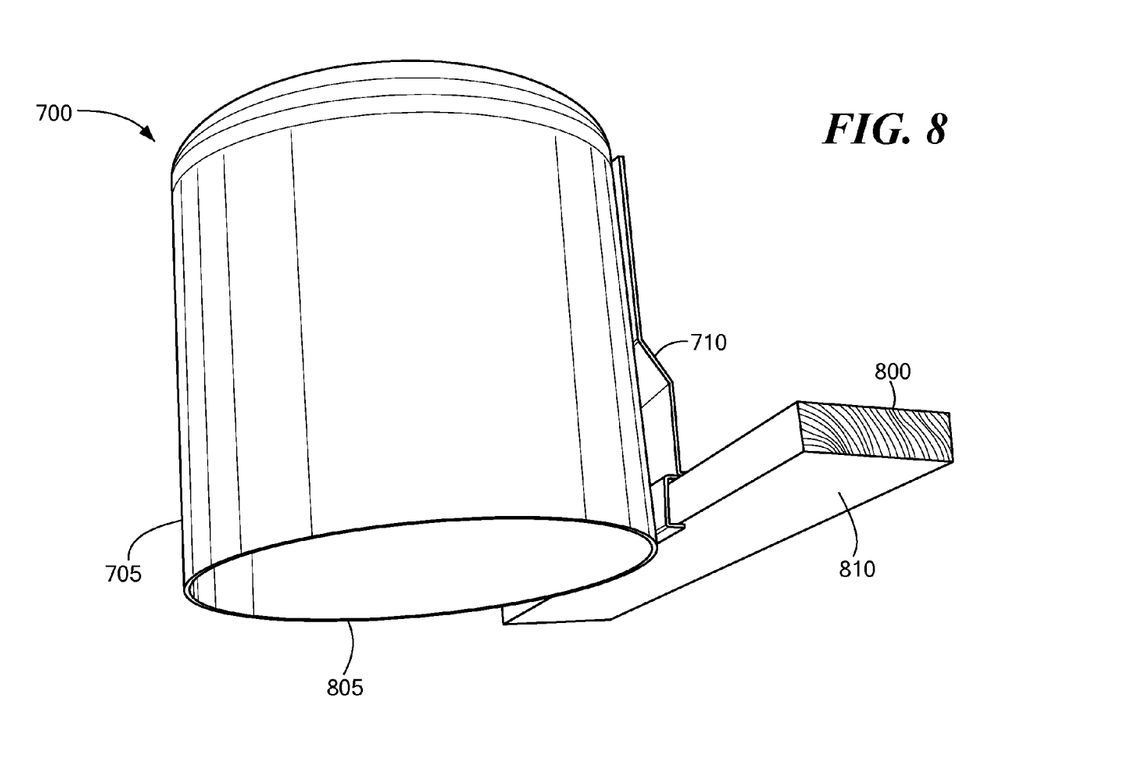
FIG. 8 is a side (and partially cross-sectional) view of the recessed luminaire and mounting bracket of FIG. 9 attached to a wood furring.

In other embodiments of the present invention, other types of fixtures may be attached to the mounting bracket 110 or 605 described above. FIGS. 7 and 8 are perspective views (from below and to one side) of a recessed luminaire 700 (commonly referred to as a "light can") with an integral or attached mounting bracket, according to one embodiment of the present invention. FIG. 8 shows the luminaire 700 attached to a furring strip 800. The luminaire 700 includes a bracket 110 attached to a light can 705 by a connecting member 710. The connecting member 710 may be welded to the light can 705 and to the mounting bracket 110. Optionally or alternatively, the connecting member may be attached to the light can 705 or to the mounting bracket 110 with screws, adhesive or any other suitable attachment mechanism. The light can 705 defines a primary access opening 715, through which a lamp may be installed or replaced and through which light is projected while light can 705 is in use.

In other respects, the mounting bracket 110 is constructed and used as described above, with respect to FIGS. 1-5. For example, as best seen in FIG. 8, a bottom edge 805 of the light can 705 may extend down a predetermined distance below the bottom 810 of the furring strip 800, such that the bottom edge 805 of the light can 705 becomes flush with the bottom surface of a gypsum board or other material that is subsequently mounted to the furring strip 800.

In another embodiment (not shown), a light can is attached to another mounting bracket, such as the mounting bracket 605 described with reference to FIG. 6.

Figure 9:
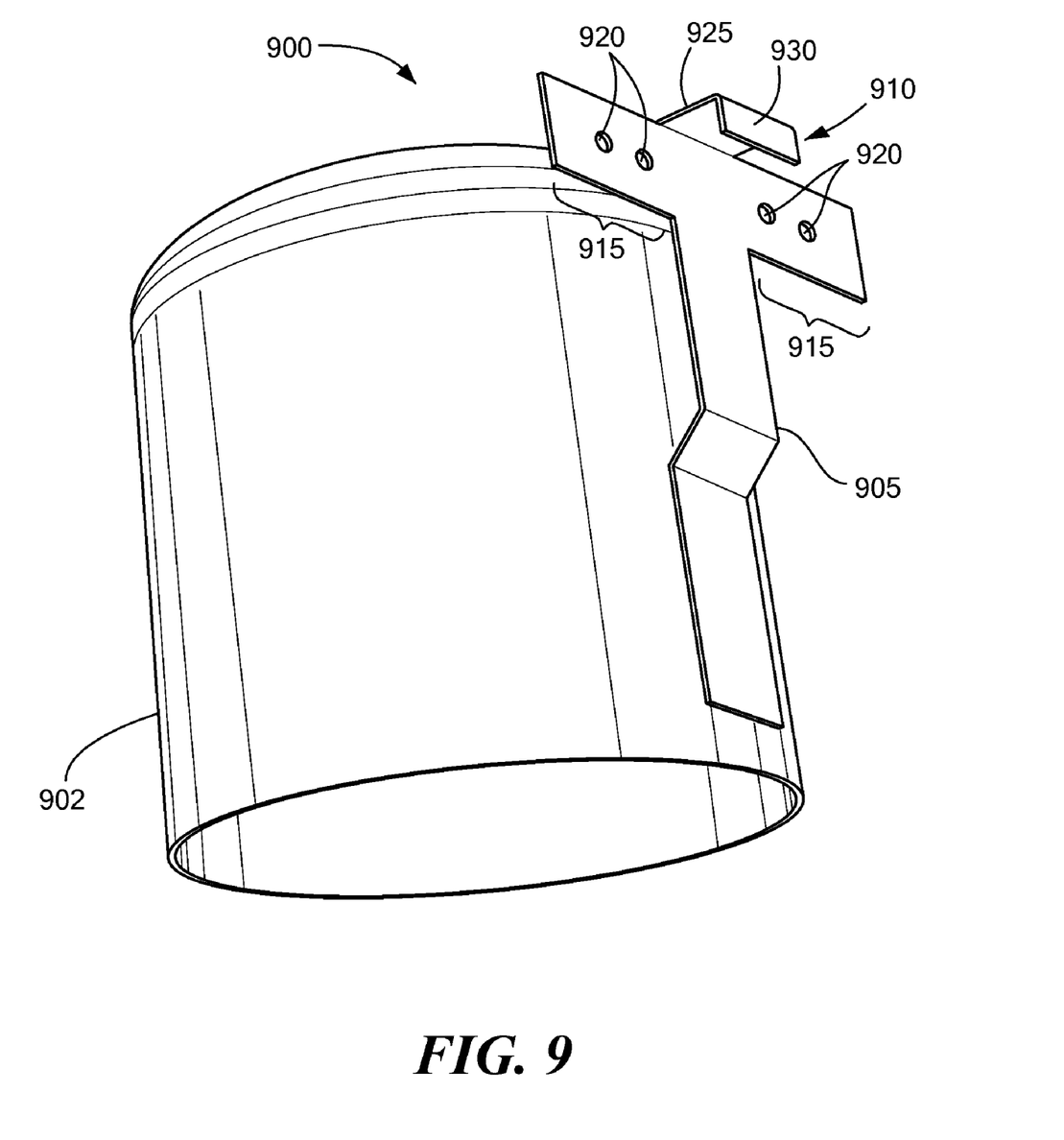
FIG. 9 is a perspective view of a recessed luminaire with an integral or attached mounting bracket, according to another embodiment of the present invention.
Figure 10:
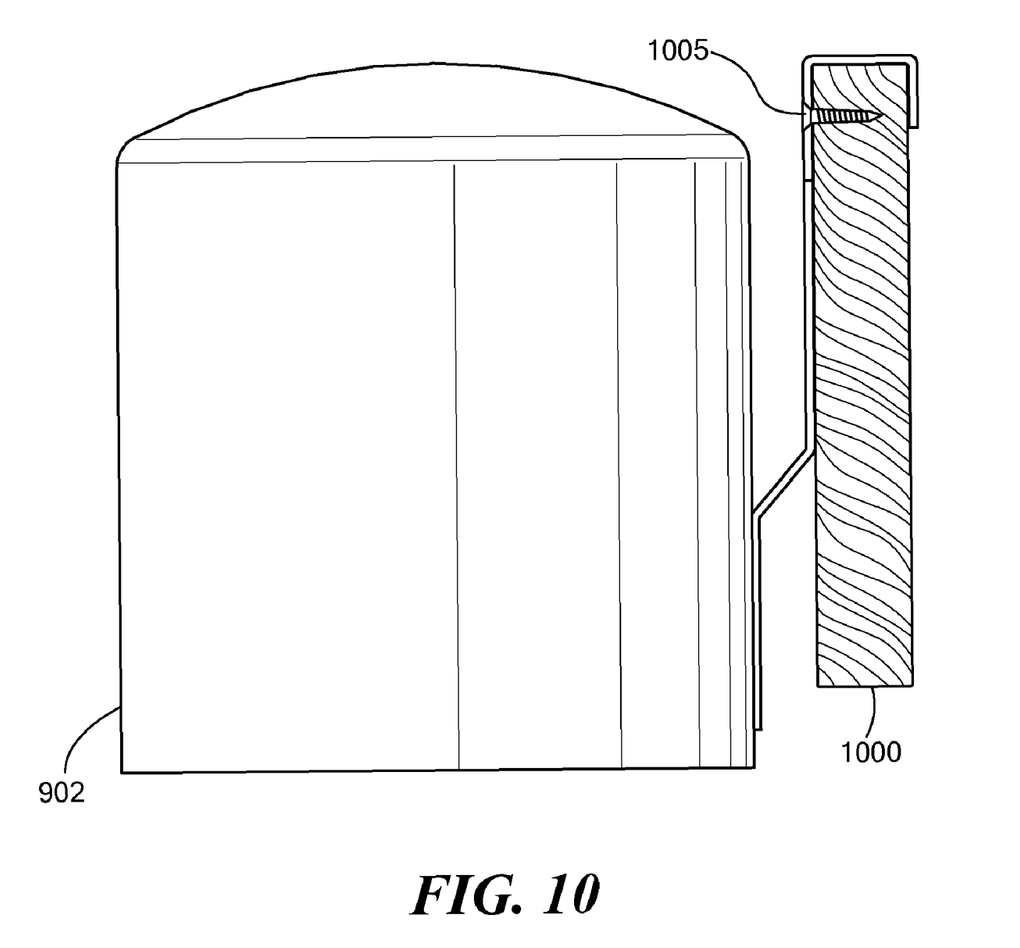
FIG. 10 is a side (and partially cross-sectional) view of the recessed luminaire and mounting bracket of FIG. 9 attached to a joist.

FIGS. 9 and 10 illustrate yet another embodiment of a mounting bracket 900. FIG. 9 is a perspective view (from below and to one side) of a light can 902 attached by a connecting member 905 to the mounting bracket 900. FIG. 10 is a side view of the light can 902 attached by the mounting bracket 900 to a joist 1000. The mounting bracket 900 is similar to the mounting bracket 605 shown in FIG. 6, except the bracket 900 includes two "wings" 915 extending from the left side. In one embodiment, the collective length of the left side, including the wings 915, is at least three times the length of the right side 930. Each wing 915 defines one or more mounting holes 920, through which fasteners, exemplified by a screw 1005 (FIG. 10), may be installed to attach the mounting bracket 900 to the joist 1000. In other respects, the mounting bracket 900 is similar to the mounting bracket 110 and 605. For example, additional holes (not shown) may be defined on the top and/or right sides 925 and 930, respectively, of the bracket 910. Optionally, the bracket 900 may include a lip (not shown), similar to the lip 130 of the bracket 110 (FIGS. 1-5).

Figure 11:
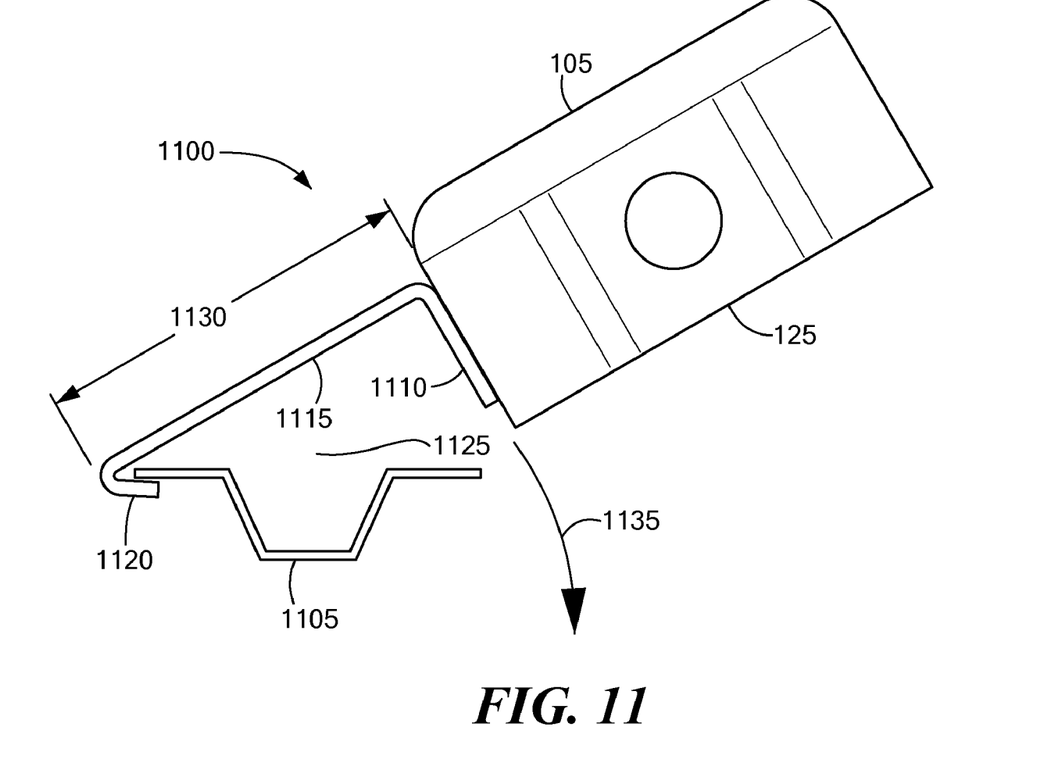
FIG. 11 is a side (and partially cross-sectional) view of an electrical fixture that includes a junction box with an integral or attached mounting bracket being attached to a metal furring strip, according to another embodiment of the present invention.
Figure 12:
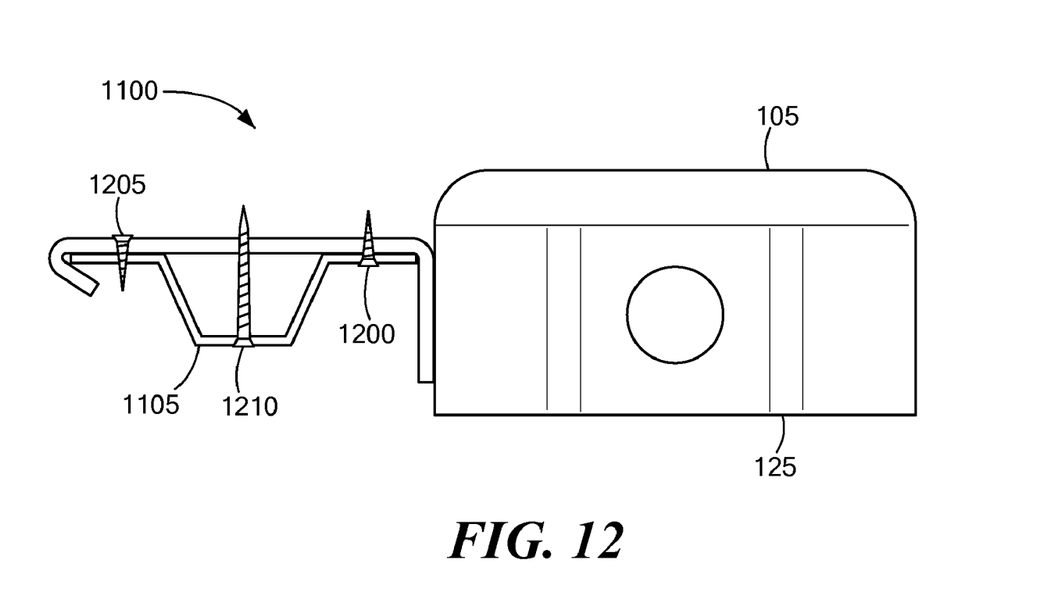
FIG. 12 is a side (and partially cross-sectional) view of the fixture of FIG. 11 fully attached to the furring strip.

Thus far, mounting brackets have been described in use with wood structural members. In some contexts, metal furring strips (sometimes called "furring channels") are used. FIGS. 11 and 12 illustrate another embodiment of a mounting bracket 1100 that may be used with metal furring strips. FIG. 11 is a side view of the bracket 1100 being attached to a metal furring strip 1105, and FIG. 4 is a side view of the bracket 1100 fully attached to the furring strip 1105. In FIG. 12, the mounting bracket 1100 and the furring strip 1105 are shown in cross section.

The mounting bracket 1100 has a general L-shape that includes at least three sides 1110, 1115 and 1120, with two of the sides 1115 and 1120 forming an acute dihedral angle. The top side 1115 is generally perpendicular to the right side 1110, and the top side 1115 connects the other two sides 1110 and 1120 together. The three sides 1110-1120 define (in cross-section) an opening 1125 in which the furring strip 1105 may be received.

FIGS. 11 and 12 show the mounting bracket 1100 used with a junction box 105. As noted with respect to FIGS. 3-4, the junction box 105 has a primary access opening 125. It should be noted that the structural member receiver opening 1125 faces in the same direction as the primary access opening 125. When used in a ceiling, both these openings 125 and 1125 typically face generally downward.

An inside dimension 1130 of the bracket 1100 is configured such that the bracket 1100 fits snugly around at least a portion of a commonly sized metal furring strip 1105, used in ceiling construction. As shown in FIG. 11, when attaching the bracket 1100 to the furring strip 1105, the left side 1120 of the bracket 1100 is hooked on one edge of the furring strip 1105, and the bracket 1100 is pivoted, as indicated by arrow 1135, until the top side 1115 of the bracket 1100 contacts the furring strip 1105. Once the bracket 1100 receives the furring strip 1105, as shown in FIG. 12, one or more fasteners, such as screws or nails, may be driven through the bracket 1100, as described above. The bracket 1100 may define one or more holes, and, as shown in FIG. 12, one or more screws 1200, 1205 and/or 1210 may be driven through the holes and into or through the furring strip 1105 to secure the bracket 1100 to the furring strip 1105. Optionally or alternatively, the top side 1115 may define an array of holes, as described with reference to FIGS. 1-4 and/or the screws may be self-drilling/self-tapping sheet metal screws. Optionally or alternatively, nails or other fasteners may be used.

As with the brackets described above, the bracket 1100 shown in FIGS. 11 and 12 may be used with recessed luminaires or other types of fixtures.

Figure 13:
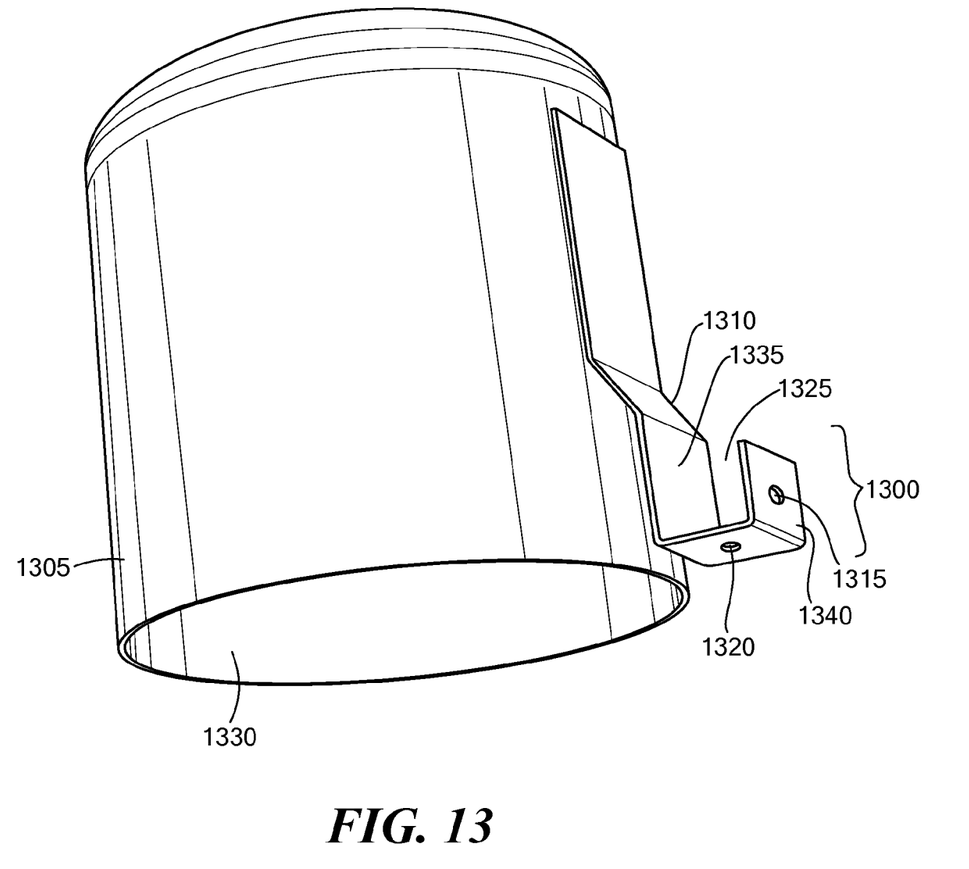
FIG. 13 is a perspective view of a recessed luminaire with an integral or attached mounting bracket, according to yet another embodiment of the present invention.
Figure 14:
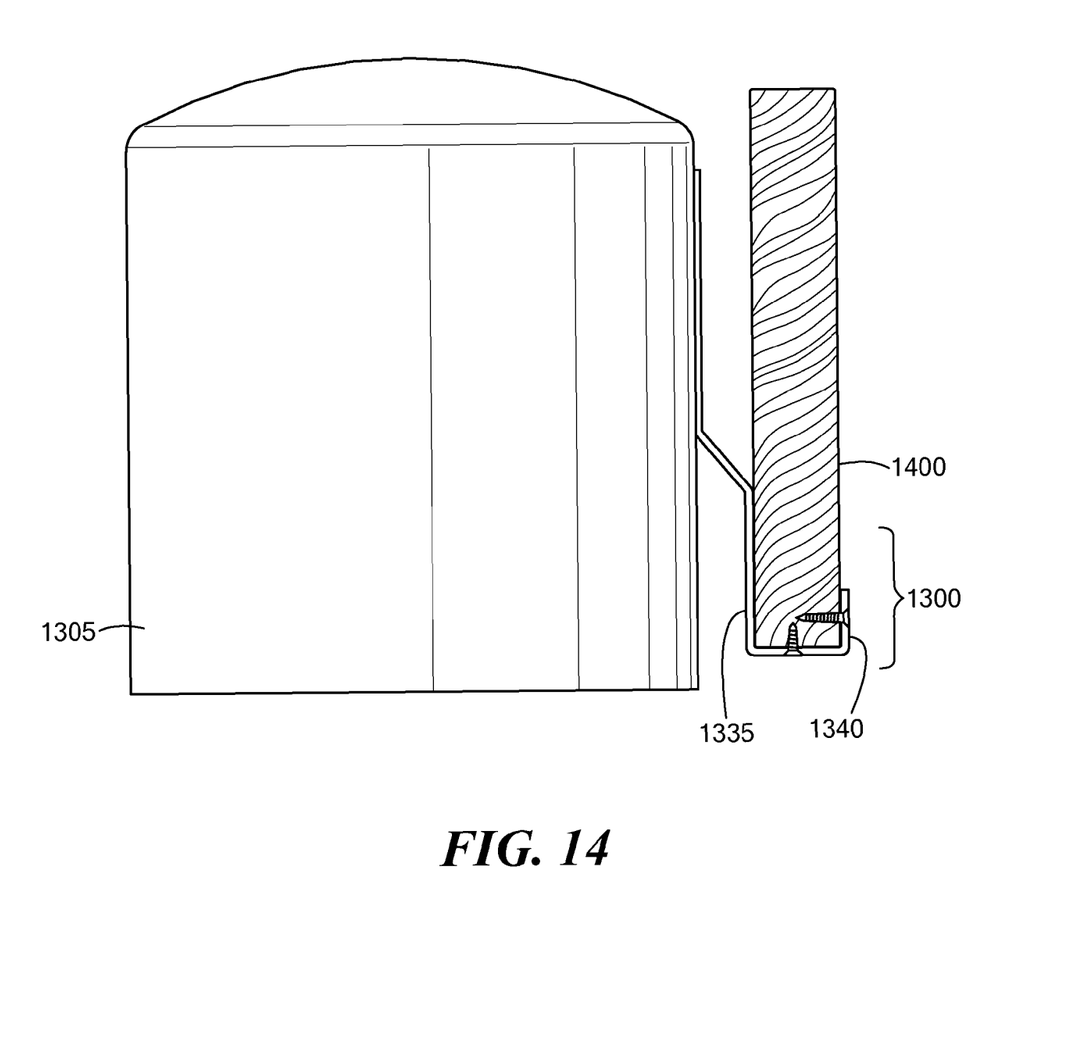
FIG. 14 is a side (and partially cross-sectional) view of the recessed luminaire and mounting bracket of FIG. 13 attached to a joist.

FIGS. 13 and 14 illustrate yet another embodiment of a mounting bracket 1300. FIG. 13 is a perspective view (from below and to one side) of a light can 1305 attached by a connecting member 1310 to the mounting bracket 1300. The light can 1305 includes a receptacle (not visible) for receiving a lamp. FIG. 14 is a side view of the light can 1305 attached by the mounting bracket 1300 to a joist 1400. The mounting bracket 1300 may define one or more holes (exemplified by holes 1315 and 1320), and fasteners (such as screws or nails) may be driven through the holes into the joist 1400. Unlike the mounting brackets described above, the mounting bracket 1300 defines a structural member receiver 1325 that faces in a direction opposite the primary access opening 1330 of the light can 1305. The sides 1335 and 1340 of the bracket 1300 may be sized and/or oriented such that an intended structural member, such as a joist, frictionally fits within the structural member receiver 1325. In one embodiment, one or both of the sides 1335 and 1340 are angled toward the other side 1335 and/or 1340, so the bracket 1300 supports the fixture while one or more fasteners are driven through the bracket 1300 and into the structural member. In another embodiment, the size of the structural member receiver 1325 is the nearly the same size as, or slightly smaller than, the corresponding dimension of the structural member 1400.

While specific values chosen for this embodiment are recited, it is to be understood that, within the scope of the invention, the values of all of parameters may vary over wide ranges to suit different applications. While the invention is described through the above-described exemplary embodiments, it will be understood by those of ordinary skill in the art that modifications to, and variations of, the illustrated embodiments may be made without departing from the inventive concepts disclosed herein. Furthermore, aspects of the disclosed embodiments may be combined in ways not illustrated. For example, the mounting bracket 900 shown in FIGS. 9 and 10 may be used with a junction box. Accordingly, the invention should not be viewed as being limited to the disclosed embodiment(s).

What is claimed is:

1. An electrical fixture for mounting to a structural member, comprising:
    a bracket comprising substantially planar first, second and third sides, such that:
        the first and third sides are parallel and spaced apart from each other;
        the second side is perpendicular to, and connects, the first and third sides; and
        the first, second and third sides define, in cross-section, a structural member receiver opening; and
    a housing attached to the bracket without blocking the structural member receiver opening and having a primary access opening facing the same direction as the structural member receiver opening,
    wherein the second side defines at least nine holes arranged in a regular two-dimensional pattern, adjacent holes being spaced apart a distance no greater than a diameter of one of the holes.

2. An electrical fixture for mounting to a structural member, comprising:
    a bracket comprising substantially planar first, second and third sides, such that:
        the first and third sides are parallel and spaced apart from each other;
        the second side is perpendicular to, and connects, the first and third sides; and
        the first, second and third sides define, in cross-section, a structural member receiver opening; and
    a housing attached to the bracket without blocking the structural member receiver opening and having a primary access opening the same direction as the structural member receiver opening,
    wherein the housing and one of the sides define coaxial holes.

3. An electrical fixture for mounting to a structural member, comprising:
    a bracket comprising substantially planar first, second and third sides, such that:
        the first and third sides are parallel and spaced apart from each other;
        the second side is perpendicular to, and connects, the first and third sides; and
        the first, second and third sides define, in cross-section, a structural member receiver opening; and
    a housing attached to the bracket without blocking the structural member receiver opening and having a primary access opening facing the same direction as the structural member receiver opening,
    wherein the bracket further comprises a lip extending from an end of the first or third side, parallel to the second side and toward the first side.

4. An electrical fixture for mounting to a structural member, comprising:
    a bracket comprising substantially planar first, second and third sides, such that:
        the first and third sides are parallel and spaced apart from each other;
        the second side is perpendicular to, and connects, the first and third sides; and
        the first, second and third sides define, in cross-section, a structural member receiver opening; and
    a housing attached to the bracket without blocking the structural member receiver opening and having a primary access opening facing the same direction as the structural member receiver opening,
    wherein the housing comprises a recessed luminaire.

5. An electrical fixture according to claim 4, wherein the first side is at least three times as long as the second side, and the first side defines a plurality of holes.

6. An electrical fixture for mounting to a structural member, comprising:
    a bracket comprising substantially planar first, second and third sides, such that:
        the first and third sides are spaced apart from each other;
        the second side connects the first and third sides;
        the second and third sides form an acute dihedral angle; and
        the first, second and third sides define, in cross-section, a structural member receiver opening; and
    a housing attached to the bracket and having a primary access opening facing the same direction as the structural member receiver opening.

7. An electrical fixture according to claim 6, wherein the housing comprises an electrical junction box.

8. An electrical fixture according to claim 6, wherein the housing comprises a recessed luminaire.

9. An electrical fixture according to claim 6, wherein the first and third sides of the bracket are spaced apart a distance equal to about a dimension of a structural member to be received in the structural member receiver opening.

10. A recessed luminaire for mounting to a structural member, comprising:
    a bracket comprising substantially planar first, second and third sides, such that:
        the first and third sides are parallel and spaced apart from each other;
        the second side is perpendicular to, and connects, the first and third sides; and
        the first, second and third sides define, in cross-section, a structural member receiver opening;

a housing attached to the bracket and having a primary access opening facing a direction opposite to the direction faced by the structural member receiver opening; and a lamp receptacle disposed within the housing.

11. An electrical fixture according to claim 10, wherein the first and third sides of the bracket are spaced apart a distance equal to about a dimension of a structural member to be received in the structural member receiver opening.

12. An electrical fixture according to claim 10, wherein the first and third sides of the bracket are spaced apart a distance equal to about the smallest dimension of a structural member to be received in the structural member receiver opening.

* * * * *

UNITED STATES PATENT AND TRADEMARK OFFICE
CERTIFICATE OF CORRECTION

PATENT NO. : 7,771,094 B2  Page 1 of 1
APPLICATION NO. : 12/140563
DATED : August 10, 2010
INVENTOR(S) : John A. Goode It is certified that error appears in the above-identified patent and that said Letters Patent is hereby corrected as shown below:

In Col. 7, Line 59
replace "mary access opening the same direction as the structural"
with "mary access opening facing the same direction as the structural"

Signed and Sealed this

Thirtieth Day of November, 2010

David J. Kappos
*Director of the United States Patent and Trademark Office*